(12) United States Patent
Caltabiano et al.

(10) Patent No.: US 11,293,783 B2
(45) Date of Patent: Apr. 5, 2022

(54) DISPLACEMENT TRANSDUCER DEVICE

(71) Applicant: SAFECERTIFIEDSTRUCTURE TECNOLOGIA S.P.A., Rome (IT)

(72) Inventors: Daniele Caltabiano, Agrate Brianza (IT); Anna Pomarico, San Cesario di Lecce (IT); Giuditta Roselli, Lecce (IT); Bruno Murari, Monza (IT); Alessandro Mariani, Lissone (IT); Giuseppe Mancini, Turin (IT)

(73) Assignee: SAFECERTIFIEDSTRUCTURE TECNOLOGIA S.P.A., Rome (IT)

( * ) Notice: Subject to any disclaimer, the term of this patent is extended or adjusted under 35 U.S.C. 154(b) by 0 days.

(21) Appl. No.: 16/769,048

(22) PCT Filed: Dec. 4, 2018

(86) PCT No.: PCT/IB2018/059623
§ 371 (c)(1),
(2) Date: Jun. 2, 2020

(87) PCT Pub. No.: WO2019/142033
PCT Pub. Date: Jul. 25, 2019

(65) Prior Publication Data
US 2020/0340831 A1 Oct. 29, 2020

(30) Foreign Application Priority Data
Dec. 4, 2017 (IT) .................. 102017000139633

(51) Int. Cl.
*G01D 5/14* (2006.01)
(52) U.S. Cl.
CPC .................. *G01D 5/145* (2013.01)

(58) Field of Classification Search
CPC ..................................... G01D 5/145
See application file for complete search history.

(56) References Cited

U.S. PATENT DOCUMENTS

| 2003/0122641 A1 | 7/2003 | Luetzow |
| 2009/0033315 A1 | 2/2009 | Kawashima et al. |

(Continued)

FOREIGN PATENT DOCUMENTS

| DE | 3809887 A1 | 10/1989 | |
| WO | 2017178985 A1 | 10/2017 | |
| WO | WO-2017178985 A1 * | 10/2017 | ........... G08B 21/182 |

*Primary Examiner* — Clayton E. LaBalle
*Assistant Examiner* — Michael A Harrison
(74) *Attorney, Agent, or Firm* — Volpe Koenig

(57) ABSTRACT

Displacement transducer device, adapted to be coupled to reference points of a structure, includes a first element integrally securable to a first reference point of the structure, first and second magnets arranged so as to magnetically repel one another, a transducer arranged proximate the first and second magnets so as to detect a variation in the magnetic field between the first and second magnet and to convert the variation into a signal processed by a processing unit, the displacement transducer device includes a second element integrally securable to a second reference point of the structure, and one of the first or second magnet or transducer being connected to the first element and the remaining elements of the first or second magnet or transducer being connected to the second element such that a relative movement of the first or the second reference point causes a variation in the magnetic field.

16 Claims, 6 Drawing Sheets

(56) References Cited

U.S. PATENT DOCUMENTS

| | | | |
|---|---|---|---|
| 2011/0248705 A1* | 10/2011 | Matsumoto | G01D 5/145 324/207.2 |
| 2013/0106404 A1 | 5/2013 | Mizutani et al. | |
| 2016/0252979 A1 | 9/2016 | Yun et al. | |
| 2017/0278383 A1 | 9/2017 | Dimberg et al. | |
| 2019/0145853 A1* | 5/2019 | Bertagnoli | G01M 5/0041 340/665 |

* cited by examiner

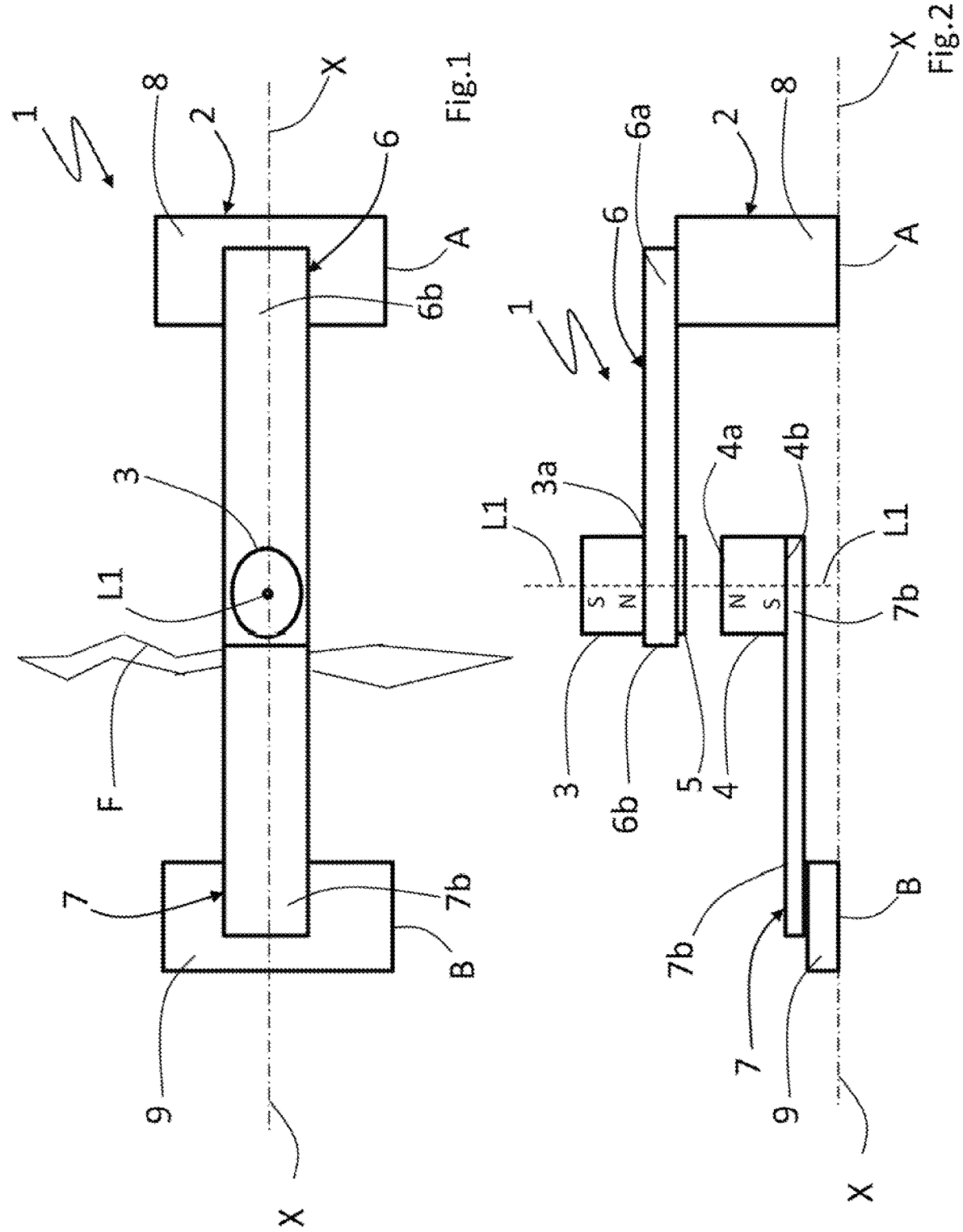

DISPLACEMENT TRANSDUCER DEVICE

TECHNICAL FIELD

The present invention relates to a movement transducer device and to an associated method of use having the features set out in the preambles of the independent claims.

TECHNOLOGICAL BACKGROUND

In the field of study aimed at the safety of building structures (structural health monitoring, SHM), it is very important to develop methods which make it possible, preferably in a simple, non-invasive manner, to analyse and monitor precisely and continuously the state of the structure in question.

In particular, the possibility of monitoring the development of any displacements of portions of the structure which are considered potentially dangerous for long periods of time (weeks, months, years) is considered to be a key parameter.

In this technological field, it is known to use linear inductive displacement transducers (linear variable displacement transducers—LVDTs) which make it possible, by electromagnetic coupling of a ferromagnetic element and a plurality of windings passed through by electrical current, to measure the linear displacement of one portion with respect to another.

However, said device, as its name suggests, can be used only for purely linear displacements.

More specifically, this limitation actually derives from the specific geometric configuration of the device and in particular from the coaxial arrangement of a movable element comprising the ferromagnetic element with respect to three circular windings within which the ferromagnetic element runs.

It is thus clear than in real applications, for structures subject to deformations linked both to loads or internal subsidences and to forces applied by the environment (such as landslides, earthquakes, slips etc.), said restrictive operating condition of the LVDTs is found to be rather problematic and limiting.

A further drawback is the need to use complex signals having a sinusoidal progression so as to be able correctly to set or correct the displacement values detected by the linear inductive displacement transducer device.

Further, it would be advantageous to be able to use instrumentation which comprises a simpler internal structure than a plurality of coaxial toroidal windings in the centre of which a ferromagnetic element runs linearly, which is in turn connected to a movable element connected to a portion of the structure in question.

DE 3809887 describes a system for detecting accelerations and displacements by way of a device comprising magnets arranged in a repulsive configuration and a transducer placed in proximity to said magnets.

This device, however, detects accelerations of movable elements which are damped by the repulsive magnetic forces of the device itself, thus countering and minimising the displacements which can take place.

Within this meaning, said device thus does not make it possible to monitor a development of displacements of portions of a structure in question completely, much less over time.

DESCRIPTION OF THE INVENTION

The object of the present invention is to provide a displacement transducer device which is structurally and functionally designed to overcome at least in part one or more of the identified drawbacks of the prior art.

Within this object, one aim of the invention is to make it possible to detect and monitor the development of any displacements of different portions of a structure in question.

The finding implemented by the present invention is a displacement transducer device adapted to be coupled to reference points of a structure, comprising a first element intended to be integrally secured to a corresponding first reference point of a structure to be monitored and a first magnet and a second magnet arranged so as to magnetically repel one another.

Preferably, the transducer device comprises a transducer arranged near to the first and second magnet and designed so as to detect a variation in the magnetic field present between the first and second magnet and to convert said variation into a signal which can be processed by a processing unit (operatively connected thereto). Advantageously, the displacement transducer device comprises a second element intended to be integrally secured to a second reference point of the structure, in such a way that one of the first magnet, second magnet or transducer is constrained to the first element and the remaining elements of the first magnet, second magnet or transducer are constrained to the second element such that a relative and independent displacement of the first reference point or of the second reference point causes a variation in the magnetic field that can be detected by the transducer.

In this context, it should be noted that the first and the second reference point identify portions of the structure in question different from one another and having the potential to move independently of one another.

In other words, housing, for example, the first and the second magnet on the first element and the transducer on the second element has the beneficial technical advantage of being able to evaluate the relative displacements between the two reference points as a function of the deformations which take place in the structure. Indeed, the two reference points of the structure may move in similar, opposite, independent etc. displacement directions or displacement amounts. This advantage cannot be obtained using the solutions provided in the state of the art.

As a result of this technical solution, it is possible to monitor relative displacements of points of a structure as a function of time. In this way, it is possible to detect starts, increases, decreases or ends of the displacements of points of the structure in question.

Indeed, it should be emphasised that in this technical solution the device does not provide an automatic return to an initial equilibrium situation; rather, the purpose of the finding implemented by the present invention is to evaluate over time what the development is of the relative displacements of the corresponding first reference point with respect to the second.

A practical example which should be clear is the application of the present device to a crack. An advantageous way of applying a technical solution implemented in accordance with the present invention provides connecting, for example, the first magnet and the second magnet to the corresponding first reference point and the transducer to the second reference point, and the first and second reference points being identified at positions which are opposite with respect to the crack under examination (in other words, one being linked to one side and the other to the opposite side of the crack or fissure). In this way, it will be possible constantly to monitor the development over time of the crack by evaluating the relative displacement of the two sides by way of the movements of the respective reference points.

It is clearly apparent that this information cannot be detected in any way using a device which is constrained to the structure at a single point or in an area of points which are integrally and rigidly interconnected without the potential for relative displacements.

This technical solution thus makes it possible to monitor and analyse effectively the state of structural safety of the structure in question. In particular, in this way it is possible to evaluate the development of the displacements which have occurred or are underway and thus also to formulate possible predictions of any developments which are potentially dangerous for the integrity of the structure itself.

The finding implemented by the present invention makes it possible, for example, to obtain a resolution of 150 nanometres on a 4 millimetre scale basis and thus to detect small but significant displacements for the purpose of evaluating the safety condition of the structure in question and the possible developments thereof over time.

Further, the finding implemented by the present invention is easily scalable as required by adapting the sizing of the magnets as a function of the extent of the displacements which it is desired to monitor.

Indeed, the present finding is scalable within a wide range of measurements of displacements simply by modifying the dimensions and types of materials concordantly as a function of the desired scale whilst maintaining the same accuracy with a relative error of 3%.

Also advantageously, the output signal of the finding implemented by the present invention is an analogue signal directly and linearly proportional to the variable which it is desired to measure (the relative displacement of two reference points). This condition makes it possible to have increased simplicity of operation together with precision and reliability of measurement.

In one embodiment, the transducer is arranged between the first magnet and the second magnet.

In this way, it is possible to obtain a more precise and reliable response on the part of the transducer, which is positioned exactly in a symmetrical configuration with respect to the progression of the magnetic field generated in a repulsive configuration.

Preferably, the first and second magnets are permanent magnets. This technical solution makes it possible to benefit from simplification of the device, which is achieved as a result of the fact that the permanent magnets do not require electrical connections to generate the magnetic field and are rather light and thus easy to transport and to assemble.

In one form of use, the transducer device is a magnetoresistive, magnetoinductive or similar sensor.

Preferably, the transducer device is a Hall effect sensor. As a result of this technical solution, it is possible to convert the variations brought about by relative displacements of the reference points, and thus the variations in the magnetic field between the first and the second magnet, rapidly and highly efficiently into variations in the electrical signal transmitted to the operatively connected processing unit.

In one embodiment, the transducer is a monoaxial, biaxial or triaxial Hall effect sensor.

Alternatively, the transducer comprises three monoaxial Hall effect sensors oriented, for example, along a set of three Cartesian axes in space.

In another embodiment, this transducer comprises a preferably monoaxial Hall effect sensor and a monoaxial, biaxial or triaxial inclinometer connected thereto so as to provide data relating to inclinations of the system along the analysed axes in addition to the data of the monoaxial Hall effect sensor relating to the aforementioned relative displacements.

Indeed, as a result of these solutions (among other alternatives), it is possible to implement a combination of information which make it possible to evaluate the components of a displacement along a desired set of three axes in space (for example a set of three Cartesian axes).

The analyses which can thus be obtained in this manner is thus more complete than for the technical solutions proposed in the prior art, since they also provide a piece of information as to how one of the two elements is being displaced and/or inclined with respect to the other reference element.

It is further important to note that the sensitivity of the transducer device according to the present invention is identical both for displacements in a specific direction in a positive sense and for displacements in the opposite sense. In other words, the sensitivity of the transducer device is identical both for positive and for negative displacements (or deformations), whilst the solutions present in the state of the art have different behaviours for compression and extension of the device.

Further, as a result of the simple and effective implementation design of the present finding, there is no need to add post-installation calibrations on site, since the presence of multiaxial sensors within the transducer device makes it possible always to know the position of the transducers and to proceed with any corrections.

Indeed, preferably, the embodiment comprising the multiaxial (for example triaxial) transducer makes it possible to calibrate the instrumentation in a simple and highly precise manner. It is thus not necessary to carry out calibration using external instrumentation which, in addition to requiring further resources necessary for correct operation, does not make it possible to guarantee correct evaluation and analysis of the data if any displacement of the transducer or of a portion thereof occurs, for example with respect to a vertical reference axis.

In other words, as a result of the monoaxial, biaxial or triaxial Hall effect sensor, the combination of the axial displacements detected using the relative inclinations makes it possible to obtain information in terms of deformation of the structure under examination or of the fissure as a function of time and thus also of any development in the propagation thereof.

Preferably, the transducer device comprises a humidity sensor and/or a temperature sensor.

As a result of these technical solutions, it is possible to compensate and correct the measured displacements as a function of the detected relative humidity and/or temperature parameters. In this way, a more correct and precise measurement of the displacements is obtained as a function of the humidity and temperature values, which are, advantageously, detected during every single measurement.

Preferably, the transducer device comprises a first spacer integrally arranged between the first reference point and the first element and a second spacer integrally arranged between the second reference point and the second element, first and second element being slab-shaped and each being connected by means of a first end to said first and second spacer, respectively.

In this way, it is possible to arrange the first and second element at different levels so as to optimise the relative spatial arrangement as a function of the specific requirements.

In one embodiment, the first and the second magnet are housed spaced apart on said first element whilst the transducer is housed on the second element so as to be arranged between the two magnets during the initial installation and monitoring phase.

The embodiments described above make it possible, in terms for example of studying the development and propagation of cracks, to position the device "astride" a fissure. In this context, the term "astride" a fissure indicates the possibility of positioning the first element integrally constrained to the corresponding first reference point (for example on a surface delimited by one side of the crack/fissure) and the second element integrally constrained to the second reference point (for example on a surface delimited by the opposite side of the crack/fissure).

As a result of this technical solution, it is thus possible to position the transducer exactly above the fissure (or investigation zone) to be analysed in such a way that the relative displacement of the first reference point with respect to the second reference point exactly corresponds to the relative displacement, for example, of the first and second magnet (housed in or on the first element) with respect to the relative displacement of the transducer housed in or on the second element.

It should be emphasised that this solution is not only effective for readings of forces applied to the structure under examination which are of an impulse type, and which thus produce large relative displacements in a short time, but above all also effective for obtaining information relating to two specific reference points of a structure which move with respect to one another over long periods (for example days, weeks, months, years etc.).

This type of solution, in particular involving reading displacements which are small over a short time but significant in the long term, cannot be implemented in accordance with the teachings of the solutions proposed in the state of the art.

In one embodiment, the first and second magnet are cylindrical or prism-shaped and have a first and second flat base, respectively, which face one another, the first base matches the upper surface of the first element, a base opposite the second base of the second magnet matches the upper surface of the second element, a first longitudinal axis passes through the respective centres of mass of the first and second magnet, and the first and second magnets are respectively connected to second free ends, which are opposite the first ends, of the first and second element such that the displacements of the first and second magnet or of the transducer caused by displacements of the first or second reference point are perpendicular to the first longitudinal axis, the first longitudinal axis being perpendicular to a straight line which passes through the first and second reference point.

Advantageously, when the transducer device is positioned at a fissure in a surface in question, the first longitudinal axis passing through the respective centres of mass of the first and second magnet is substantially perpendicular to the primary extension of the fissure and simultaneously substantially perpendicular to the straight line passing through the first and second reference point.

Within this meaning, a plane perpendicular to the longitudinal axis of potential displacements of the first and second magnet or of the transducer is defined in which the magnets translate freely without the possibility of coming into contact or colliding within one another after planar translations of the surface portions of the structure in question.

Further, as a result of this configuration, the relative displacement of the first and second magnet avoids being in proximity along the longitudinal axis, thus not bringing about a situation where the repulsive forces between the two magnets arranged in an opposite magnetic configuration increase excessively.

Advantageously, the transducer optimally detects variations in the magnetic field between the first and the second magnet linked to displacements of the reference points along vectors belonging to the perpendicular plane on said longitudinal axis.

In one embodiment, three pairs of first and second magnets are provided, each pair being positioned in a repulsive magnetic configuration, along three mutually orthogonal longitudinal axes. In this way, a triaxial transducer device is implemented which is suitable for detecting separately the individual displacement components for each of the three orthogonal axes thus defined.

In particular, the transducer device preferably comprises a first pair of first and second magnets, a second pair of first and second magnets, a third pair of first and second magnets, respectively carrying a first transducer, a second transducer and a third transducer arranged between said pairs of magnets.

In one embodiment, the first longitudinal axis of the first pair of the first and second magnets is perpendicular both to the straight line passing through the first and second reference point and to the primary extension of the fissure, when present on a surface of a structure in question; the second longitudinal axis of the second pair of the first and second magnets is parallel to the straight line passing through the first and second reference point and perpendicular to the primary extension of the fissure, when present; the third longitudinal axis of the third pair of the first and second magnets is perpendicular to the straight line passing through the first and second reference point and parallel to the primary extension of the fissure, when present.

In this way, a triaxial transducer device is implemented which is capable of separately detecting the individual displacement components for each of the three mutually perpendicular axes thus defined.

It is clearly apparent that this technical solution is capable of providing a complete and exhaustive description of any relative displacements of the first and/or second reference point in space.

In one embodiment, the first and second magnet are cylindrical or prism-shaped, and have a first and second flat base respectively, that face one another, the first base is oriented perpendicularly to the upper surface of the first element, the second base is oriented perpendicularly to the upper surface of the second element, and a second longitudinal axis passes through the respective centres of mass of said first and second magnet. Alternatively, the first and second magnet are prism-shaped.

Advantageously, the first and second magnets are respectively connected to second free ends, which are opposite the first ends, of the first and second elements such that the displacements of the first and second magnet or of the transducer caused by relative displacements of the first or second reference point are parallel to the second longitudinal axis, the second longitudinal axis thus being perpendicular to a straight line which passes through the first and second reference points.

Preferably, the first and second magnet are cylindrical or prism-shaped, have a first and second flat base, respectively, which face one another, and are integrally constrained to the first element, and the transducer is connected to the second element.

In this embodiment, it is the transducer which can move independently of the first and second magnet, detecting a highly linear progression of the variation in the magnetic field.

The method of the present invention comprises the operative steps set out hereinafter.

In one embodiment, the method for detecting the displacements between two reference points of the structure comprises:
- providing the displacement transducer device,
- identifying a first reference point and a second reference point B of the structure in question,
- constraining a first element of the displacement transducer device to the corresponding first reference point,
- constraining a second element of the displacement transducer device to the second reference point,
- constraining a processing unit to a transducer of the displacement transducer device, and
- monitoring the data collected by the transducer and processed by said processing unit so as to detect any relative movements of said first and second reference point as a function of time.

In this way, a method is implemented which makes it possible to install the movement transducer device of the present invention rapidly and in a simple manner on the structure in question and to evaluation the progression over time of any displacements of the portions thereof.

Advantageously, the processing unit is operatively connected to further processing units via communications means such as USB connections, uSD card, BTLE, LoRa, Cloud etc.

In one embodiment, the processing unit is capable of reading the signals of the transducer, storing them locally, and sending or transferring them to a host computer or to a cloud system using said USB, uSD card, BTLE, LoRa etc. means of communication.

Advantageously, the processing unit it removable from said transducer device.

Preferably, an alert message is sent via communications means operatively connected to the processing unit when the value of the relative displacements of the first and second reference point reaches or exceeds a predefined threshold value.

In this way, it is possible to detect effectively and rapidly a condition of significant variation in the preceding structural condition and/or a situation of potential danger.

BRIEF DESCRIPTION OF THE DRAWINGS

The features and advantages of the invention will be clearer from the detailed description of a preferred embodiment thereof, illustrated for purposes of identification and in a non-limiting manner with reference to the accompanying drawings, in which:

FIG. 1 is a view from above of a movement transducer device,

FIG. 2 is a side view of the device of FIG. 1,

PREFERRED EMBODIMENT OF THE INVENTION

Figure 3:
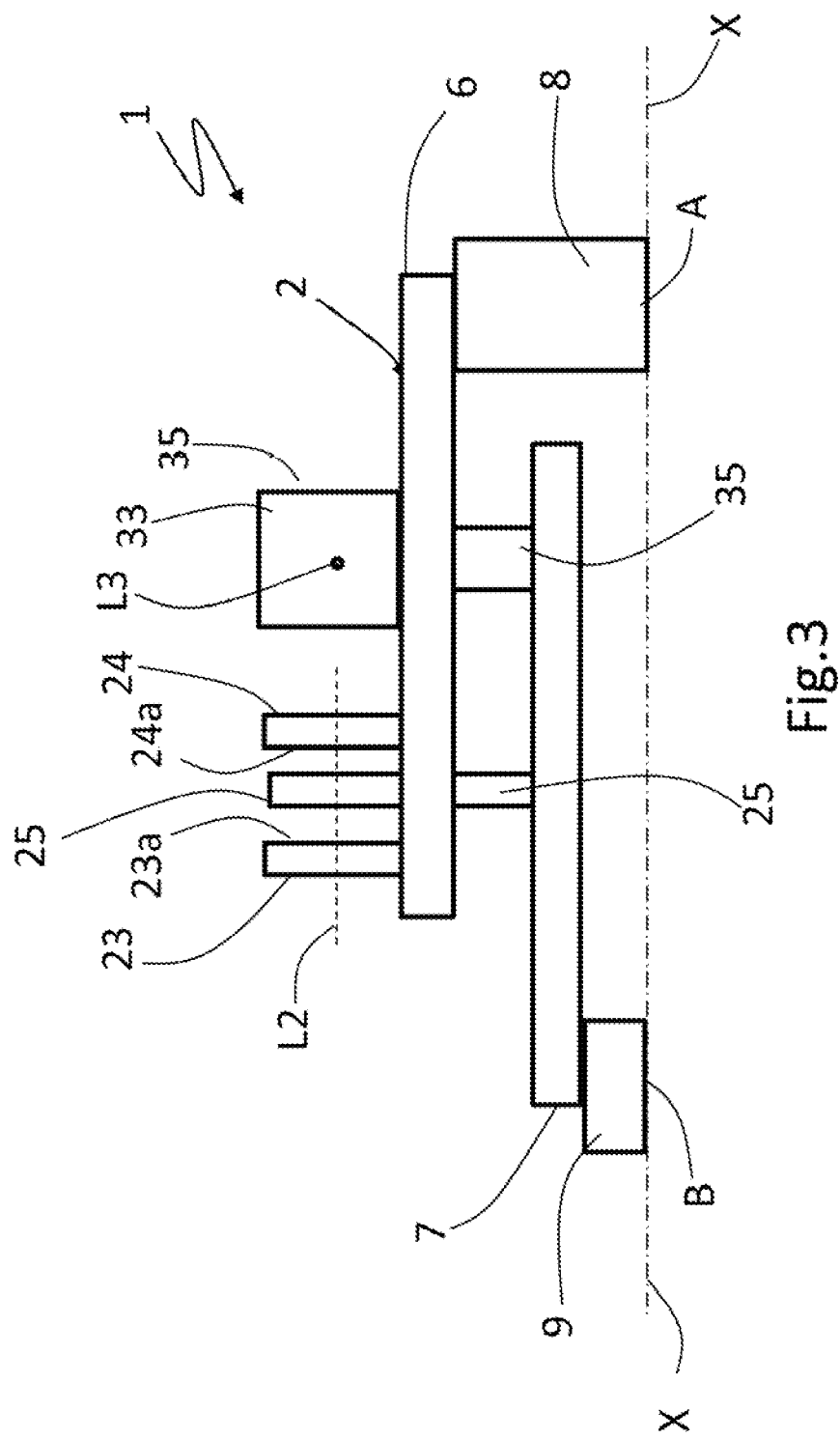
FIG. 3 is a view from above of a further embodiment of the transducer device of the present invention.

In the drawings, 1 denotes as a whole a displacement transducer device which can be coupled to reference points of a structure comprising a first element 6, intended to be integrally secured to a corresponding first reference point A of the structure, and a first magnet 3; 23; 33 and a second magnet 4; 24; 34 arranged so as to magnetically repel one another, in other words having identical poles on mutually facing surfaces.

It is found that the repulsive magnetic configuration thus provides that the two magnets are arranged having two identical poles, for example N and N as shown in FIG. 2, facing one another. In this way, a repulsive magnetic force is implemented between the two magnets.

This repulsive magnetic configuration makes it possible to implement a zone of highly linear magnetic behaviour in a vicinity between the positions of the first and second magnet 3, 4; 23, 24; 33, 34. This particular linear zone makes it possible precisely to correlate magnetic variations with relative displacements of the first and second magnet 3, 4; 23, 24; 33, 34 or of the transducer 5; 25; 35.

The Applicant has verified that the equation of the magnetic field relating to the first and second magnet 3, 4; 23, 24; 33, 34 is not linear. The equations relating to the total magnetic field $B_{Tot}$ for a pair of cylindrical magnets arranged with the primary axes aligned and in a repulsive magnetic configuration (for example with the respective N poles facing one another) are set out below.

$$B_{Tot} = B_{M1} + B_{M2}$$

where $B_{M1}$ is the magnetic field produced by the first magnet 3 and $B_{M2}$ is the magnetic field produced by the second magnet 4, and where $$B_{M1} = B_R/2\left(\frac{\Delta + z}{\sqrt{R^2 + (\Delta + z)^2}} - \frac{z}{\sqrt{R^2 + z^2}}\right)$$

$$B_{M2} = -B_R/2\left(\frac{\Delta + d - z}{\sqrt{R^2 + (\Delta + d - z)^2}} - \frac{d - z}{\sqrt{R^2 + (d - z)^2}}\right)$$

wherein
- $\Delta$ is the thickness of the first magnet 3 (measured along the direction defined by the axis passing through the centres of mass),
- z is the distance between the closer face of the first magnet 3 to a point P at which the magnetic field is calculated belonging to the axis passing through the centres of mass of the first and second magnet 3, 4,
- d is the distance between the opposite faces of the first and second magnet 3, 4 (advantageously the first and second magnet have said faces perpendicular to the axis passing through the centres of mass of the first and second magnet 3, 4),
- $B_R$ is the value of the magnetic field as a function of the radial distance from the centre of mass and thus also from the axis passing through the centres of mass.

The Applicant has thus verified that the sum of BM1 and BM2, when the first and second magnet 3, 4; 23, 24; 33, 34 are arranged and configured in accordance with the features of the present finding, comprises a minimised, virtually negligible zone of non-linearity.

Figure 5:
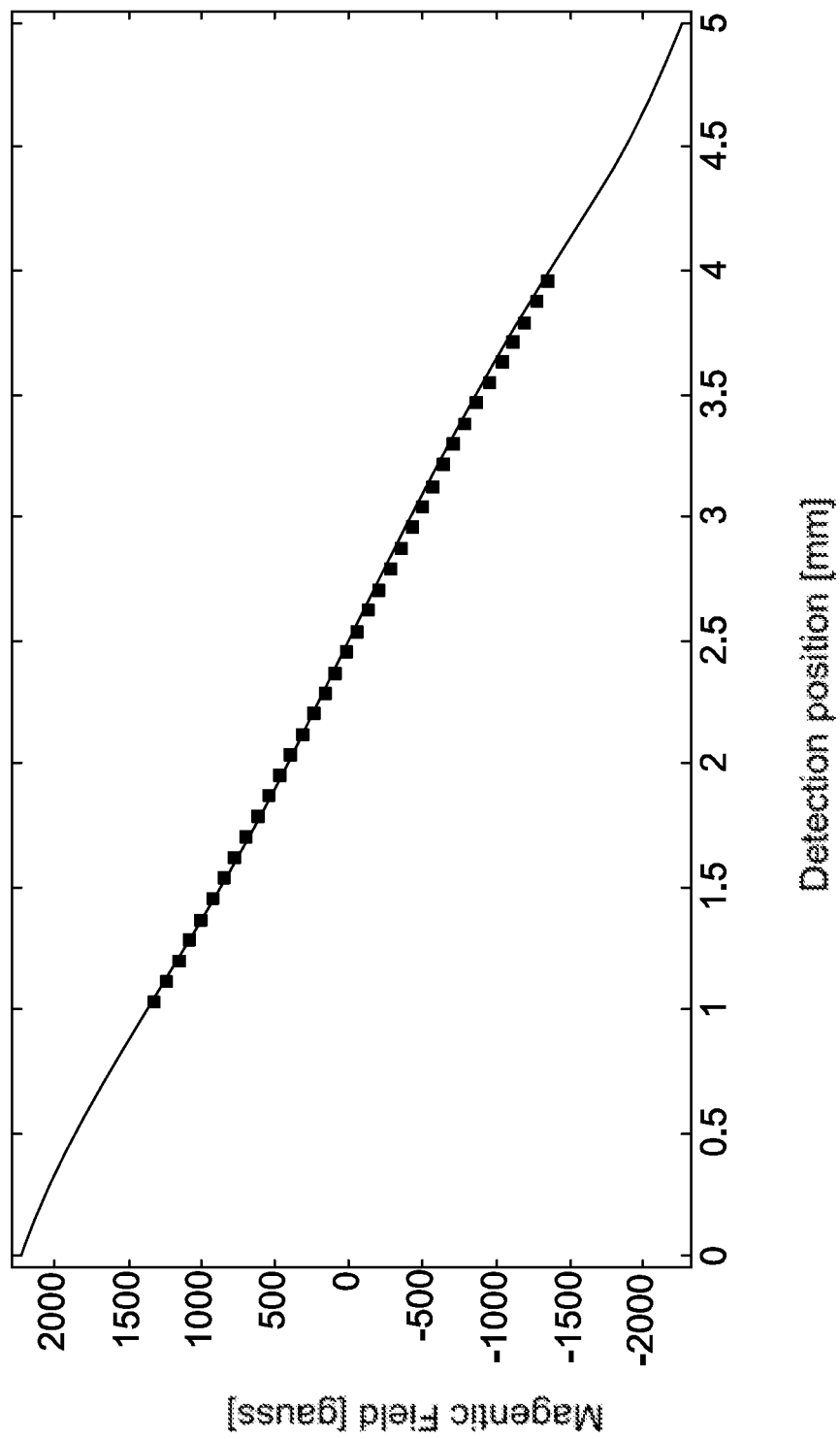
FIG. 5 is a graph of the progression of the magnetic field between two opposite magnets positioned at a fixed distance, as a function of the distance from one of the two magnets, as observed by the finding implemented by the present invention.

In particular, referring to FIG. 5, the progression of a magnetic field between +2000 and −2000 gauss, created by two magnets positioned at a fixed distance of 5 mm, as a function of the detection position between the first and second magnet 3, 4; 23, 24; 33, 34 in an interval of between 0 and 5 mm, is shown by way of example in a non-limiting manner.

The Applicant has verified that these simulated displacements correspond to real displacements of the structure with a correlation coefficient $R^2$ greater than or equal to 0.9998.

The first and second magnet 3, 4; 23, 24; 33, 34 are advantageously natural, sintered or electromagnetic magnets.

Preferably, referring to FIGS. 1 and 2, a transducer 5; 25; 35 is placed in proximity to the first and second magnet 3, 4; 23, 24; 33, 34 and configured so as to detect a variation in the magnetic field present between the first and second magnet 3, 4; 23, 24; 33, 34 and to transform it into a signal which can be processed by a processing unit (not shown in the drawings).

Further, the displacement transducer device 1 comprises a second element 7 intended to be integrally fixed to a second reference point B of the structure, one of the first magnet 3; 23; 33, second magnet 4; 24; 34 and transducer 5; 25; 35 being connected to the first element 6 and the remaining elements of the first magnet 3; 23; 33 second magnet 4; 24; 34 or transducer 5; 25; 35 being connected to the second element 7 in such a way that a relative displacement of the first reference point A or of the second reference point B includes a variation in the magnetic field detectable by the transducer 5.

Advantageously, the transducer 5; 25; 35 is capable of providing an electrical, optical or similar signal which can be processed by the processing unit.

Preferably, the first and the second reference point A and B are adjacent points on a continuous, uniform surface of a structure in question, or else may also be points of a structure which are separated by fissures, subsidences, defects of varying nature etc.

Advantageously, the first element 6 is comprised in a housing 2 which also comprises any further electronic devices connected to the transducer 5; 25; 35.

In one embodiment, the first element 6, the second element 7 and/or the housing 2 are formed of diamagnetic or nonmagnetic material, for example ceramics, such as alumina, metals, such as austenitic stainless steel (having linear thermal expansion coefficients similar or near to those of the concretes or cements with which the structures in question are typically implemented) or brasses, or polymers such as polyvinyl chloride, polymer matrix composites (FR4) or the like.

Preferably, the housing 2 comprises extensions which integrally connect the first element 6 to the second element 7. Also preferably, two through-holes 18, 19 are formed on the first and second element 6, 7 at the first and second reference point A, B respectively of the structure in question.

This technical solution makes it possible to position the transducer device 1 on the surface of the structure in question, rapidly to identify the reference points in a simple manner, to connect said transducer device 1 precisely, for example by way of screws or nails passing through said two holes 18, 19, to the surface of the structure in question, and subsequently to remove the extensions interconnecting the first and second element 6, 7, rendering them free to move independently.

Advantageously, these extensions are formed of ceramic, metal or preferably polymer (for example PVC) material, thus being easy to shear or remove using similar processing techniques.

In one embodiment, referring to FIG. 2, the transducer 5 is positioned between the first magnet 3 and the second magnet 4. Advantageously, still referring to FIG. 2, the transducer 5 is connected to one face of the first element 6 opposite the face intended to connect the first magnet 3.

Preferably, the first and second magnet 3, 4; 23, 24; 33, 34 are permanent magnets. For example, the first and the second magnet 3, 4; 23, 24; 33, 34 are systems including iron, nickel, cobalt or alloys of rare earths or else natural minerals such as magnetite. More preferably, permanent sintered ferrite or neodymium magnets are used.

In one embodiment, the transducer 5; 25; 35 is a Hall effect sensor. Advantageously, the Hall effect sensor makes it possible to transform variations in the magnetic field into variations in the electrical current detected by the device itself. In this way, it is thus possible precisely to measure very small variations in the magnetic field between the first and second magnet 3, 4; 23, 24; 33, 34 and detected by the transducer 5; 25; 35 and thus to be able to calculate the corresponding relative displacement of the first reference point A with respect to the second reference point B with a sensitivity for example of 150 nanometres on a 4 millimetre scale basis. As set out above, this measurement can easily be scaled as required as a result of the technical features of the present finding.

Preferably, referring to FIGS. 1 and 2, the transducer device 1 comprises a first spacer 8 integrally arranged between the first reference point A and the first element 6 and a second spacer 9 integrally arranged between the second reference point B and the second element 7, the first and second element 6, 7 being slab-shaped and each of them being connected at a first end 6a, 7a respectively to the first and second spacer 8, 9.

Advantageously, the first element 6, the second element 7, the first spacer 8 and the second spacer 9 are formed of plastics materials or plastics matrix composite materials which are simple to produce and process using industrial technologies known in the art in the sector.

In one embodiment, the fixed parts which make up the transducer device 1 are connected to one another and/or to the surface of the structure in question by way of holding means such as bonding, screws etc. Further, the first element 6 may preferably be connected to the second element 7 by way of a slide which makes relative translation thereof possible.

Preferably, referring to FIG. 1-4, a first pair of the first and second magnet 3, 4 is identified, the first and second magnet 3, 4 being cylindrical or prism-shaped and having a first and second flat base 3a, 4a, respectively, which face one another. Advantageously, referring to FIGS. 1 and 2, the first base 3a is in abutment with the larger surface of the first element 6, a base 4b opposite the second base 4a of said second magnet 4 is in abutment with the larger surface of the second element 7, a first longitudinal axis L1 passing through the respective centres of mass of the first and second magnet 3, 4, the first and second magnet 3, 4 are respectively connected to second free ends 6b, 7b, opposite the first ends 6a, 7a, of the first and second element 6, 7 in such a way that the displacements of the first and second magnet 3, 4 or of the transducer 5 brought about by displacements of the first or second reference point A, B are perpendicular to the first longitudinal axis L1, which is thus the first longitudinal axis L1 perpendicular to a straight line X passing through the first and second reference point A, B.

Advantageously, still referring to FIGS. 1 and 2, when the transducer device 1 is positioned at a fissure F of a surface in question, the first longitudinal axis L1 passing through the respective centres of mass of the first and second magnet 3, 4 is substantially perpendicular to the primary extension of the fissure F and simultaneously substantially perpendicular to the straight line X passing through the first and second reference point A, B. More preferably, the first and second element 6, 7 are positioned on opposite sides of said fissure F.

More precisely, the vectors of the possible displacements of the first and second magnet 3, 4 belong to a plane perpendicular to the longitudinal axis L.

In this way, with respect to the initial position as shown in FIG. 2, the repulsive magnetic force between the first and the second magnet 3, 4 will decrease for any displacement of one of the two magnets 3, 4 belonging to said plane perpendicular to the longitudinal axis L.

Advantageously, the transducer 5 optimally detects variations in the magnetic field between the first and second magnet 3, 4 linked to displacements of the reference points along vectors belonging to the plane perpendicular to said longitudinal axis L.

Figure 4:
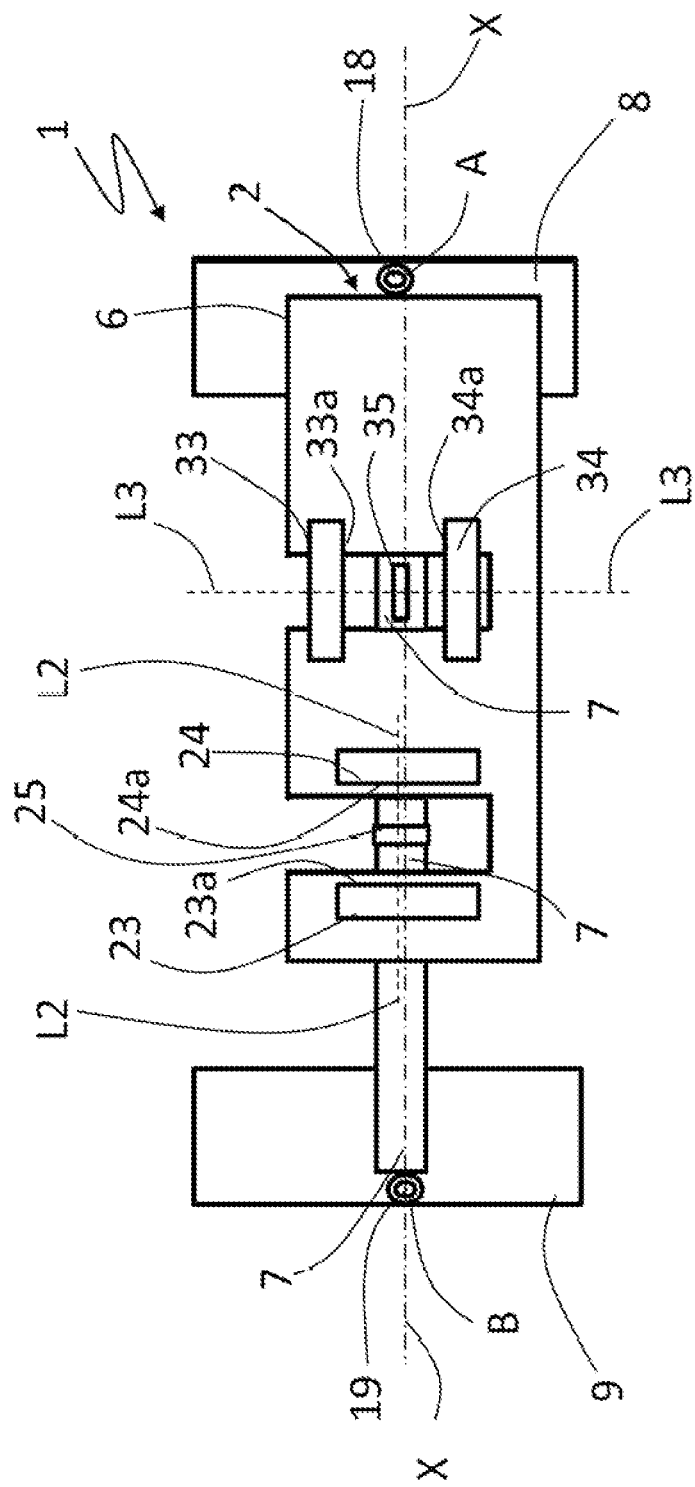
FIG. 4 is a side view of the device of FIG. 3.
Figure 6:
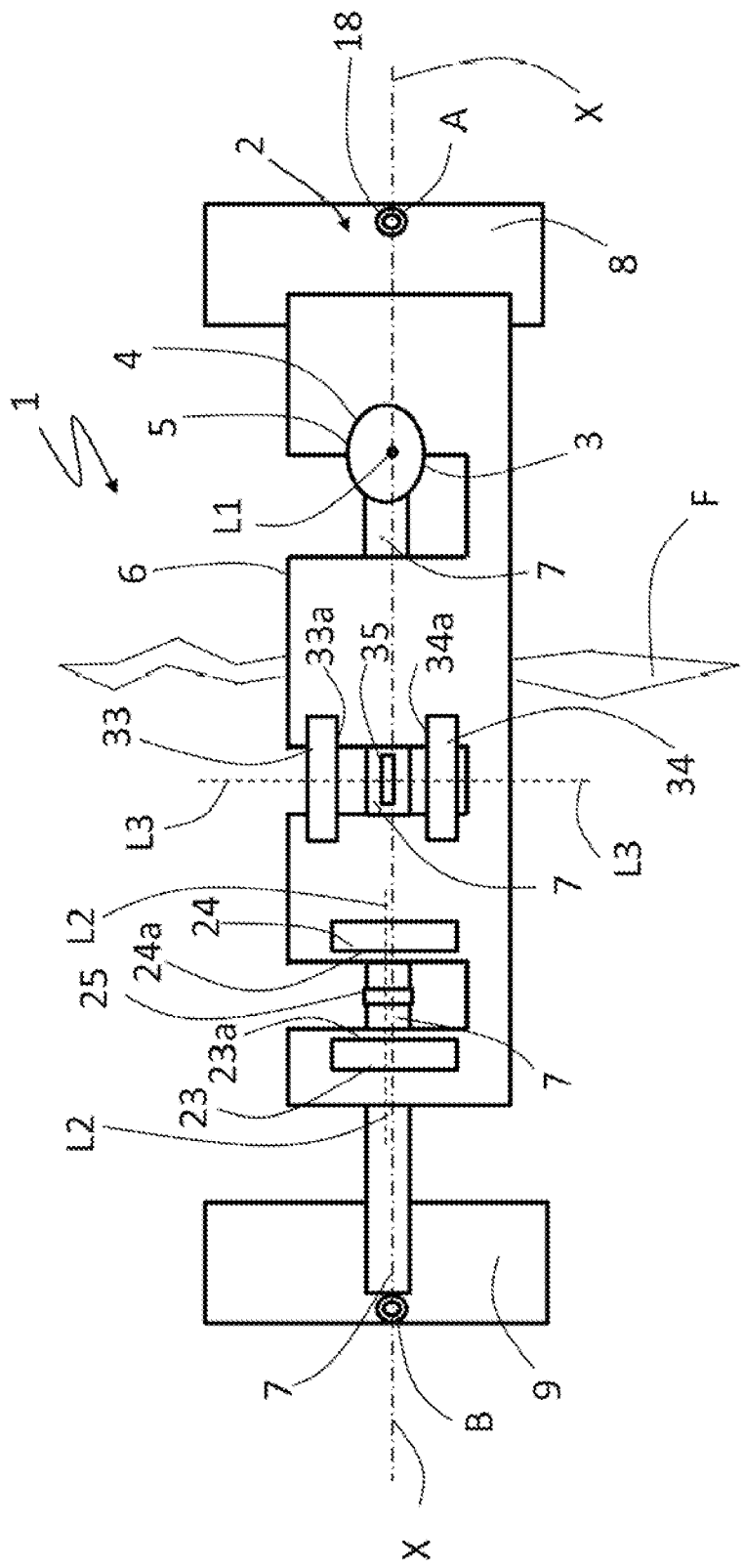
FIG. 6 is a view from above of a further embodiment of the transducer device of the present invention for triaxial displacements.

In one embodiment, referring to FIGS. 3, 4 and 6, the first and second magnet 23, 24 are cylindrical or prism-shaped and have respective first and second flat bases 23a, 24a which face one another, the first base 23a is orientated perpendicular to the larger surface of the first element 6, the second base 24a is orientated perpendicular to the larger surface of the first element 6 or of the second element 7, a second longitudinal axis L2 passes through the respective centres of mass of the first and second magnet 23, 24, and the first and second magnet 23, 24 are respectively connected to or near to second free ends 6b, 7b, opposite the first ends 6a, 7a, of the first and second element 6, 7, in such a way that the displacements of the first and second magnet 23, 24 or of the transducer 25 brought about by displacements of the first or second reference point A, B are parallel to the second longitudinal axis L2, said second longitudinal axis L2 being parallel to the X passing through the first and second reference point A, B.

In this configuration, a displacement of the first and second magnet 23, 24 which ends up bring them closer to one another also brings about an increase in the repulsive magnetic force between them.

Alternatively, the first and second magnet 23, 24 are cylindrical or prism-shaped and have respective first and second flat bases 23a, 24a which face one another, the first base 23a and the second base 24a are orientated perpendicular to the larger surface of the first element 6, a second longitudinal axis L2 passes through the respective centres of mass of the first and second magnet 23, 24, the first and second magnet 23, 24 are respectively connected to or near to said second free end 6b, opposite the first end 6a, of the first element 6 and the transducer 25 is connected near to a second free end 7b of the second element 7 and arranged between the first and second magnet 23, 24, in such a way that the displacements of the first and second magnet 23, 24 or of the transducer 25 which are brought about by displacements of the first or second reference point A, B are parallel to the second longitudinal axis L2, said second longitudinal axis L2 being parallel to the straight line X passing through the first and second reference point A, B.

In this case, the variation in the magnetic field between the first and second magnet 23, 24 is not given by a physical relative displacement of the two magnets but rather by a displacement of the transducer 25 with respect to said first and second magnet 23, 24.

These various configurations may be selected selectively as desired, for example evaluating the approach of the two reference points A, B more and more precisely (and thus taking advantage of the possibility that in the last described case the repulsive magnetic force increases) or less.

In particular, the Applicant has verified that, for example, some embodiments, which provide that the variation in the magnetic field between the first and the second magnet 23, 24 is not given by a physical relative displacement of the two magnets but rather by a displacement of the transducer 25 with respect to said first and second magnet 23, 24, make it possible to obtain a more extensive zone of linearity of the total magnetic field $B_{Tot}$ than that obtained by physically displacing at least the first or second magnet 3, 4 and 23, 24 and 33, 34 with respect to one another.

In one embodiment, three pairs of first and second magnets 3, 4 and 23, 24 and 33, 34 are displaced, each pair being positioned in a repulsive magnetic configuration, along three longitudinal mutually orthogonal axes (see FIG. 6).

Preferably, referring to FIG. 6, the transducer device 1 comprises a first pair of first and second magnets 3, 4, a second pair of first and second magnets 23, 24, a third pair of first and second magnets 33, 34, having respectively a first transducer 5, a second transducer 25, a third transducer 35 arranged between said pairs of magnets.

Preferably, referring to FIG. 6, the first longitudinal axis L1 passes through the respective centres of mass of the first pair of the first and second magnets 3, 4 and is perpendicular both to the straight line X passing through the first and second reference point A, B and to the primary extension of the fissure F, if present, the second longitudinal axis L2 passes through the respective centres of mass of the second pair of first and second magnets 23, 24 and is parallel to the straight line X passing through the first and second reference point A B and perpendicular to the primary extension of the fissure F, if present, the third longitudinal axis L3 passes through the respective centres of mass of the third pair of first and second magnets 33, 34 and is perpendicular to the straight line X passing through the first and second reference A, B and parallel to the primary extension of the fissure F, if present.

Advantageously, still referring to FIG. 4 or 6, the third pair of first and second magnets 33, 34, in which the first and second magnet 33, 34 are cylindrical or prism-shaped, have respective first and second bases 33a, 34a which face one another, the first base 33a and the second base 34a are oriented perpendicular to the larger surface of the first element 6 and perpendicular to said second longitudinal axis L2, when identifiable, a third longitudinal axis L3 passes through the respective centres of mass of the first and second magnet 33, 34, the first and second magnet 33, 34 are connected respectively to or near to said second free end 6b, opposite the first end 6a, of the first element 6 and the transducer 35, and connected near to a second free end 7b of the second element 7 and arranged between the first and the second magnet 33, 34, in such a way that the third longitudinal axis L3 is perpendicular to the straight line X passing through the first and second reference points A, B and parallel to the maximum extension of the fissure F, if present.

In this way, a triaxial transducer device is implemented which is capable of detecting separately the individual displacement components for each of the three orthogonal axes thus defined.

Figure 7:
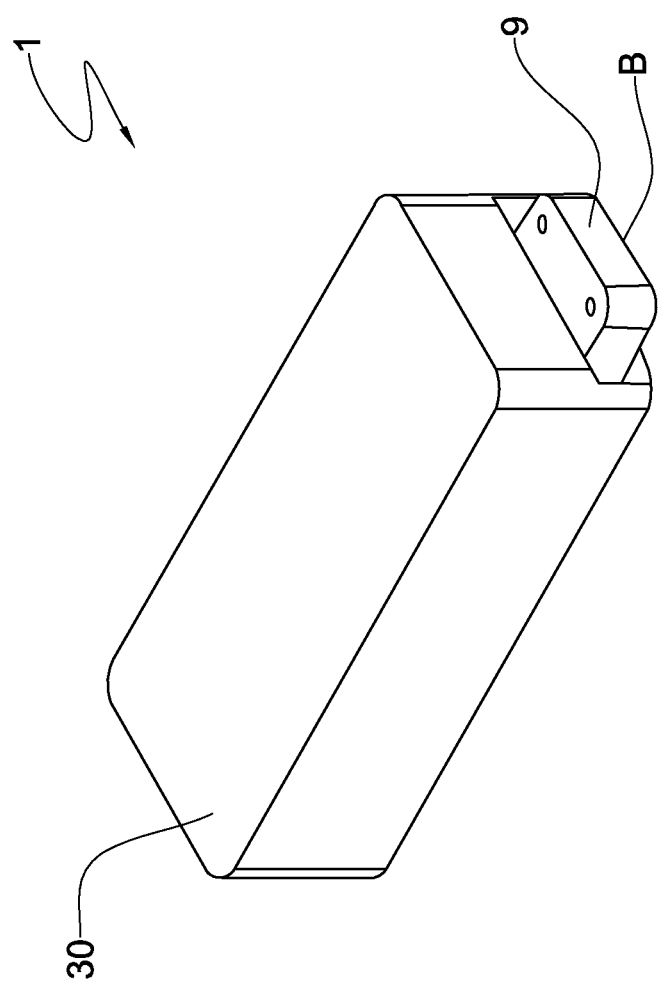
FIG. 7 is a perspective view of the movement transducer device provided with a cover.

In an embodiment shown in FIG. 7, the transducer device 1 comprises a cover 30, housed preferably on said first and second element 6, 7 or on said first and second spacer 8, 9. Advantageously, this cover 30 has a hollow box shape and is shaped so as substantially to cover the remaining components of the transducer device itself (including, for example, the first and second magnet 3, 4, the transducer 5 and any electrical connections) so as to protect them from any humidity, liquids or dirt present in the environment. Also advantageously, this cover 30 has on one face an opening shaped so as to make considerable displacement possible relative to a device portion connected to one of the reference points of the structure.

Preferably, the method of the present invention comprises the operating steps set out above.

In one embodiment, the method for detecting the displacements between two reference points of the structure comprises:

providing a displacement transducer device 1 formed, at least in part, in accordance with the technical features described above, identifying a corresponding first reference point A and a second reference point B of the structure in question, constraining a first element 6 of said displacement transducer device 1 to said first reference point A, constraining a second element 7 of said displacement transducer device 1 to said second reference point B, connecting a processing unit to a transducer 5 of said displacement transducer device 1, and monitoring the data collected by the transducer 5 and processed by said processing unit so as to detect any relative movements of said first and second reference point A, B as a function of time.

Advantageously, the data collected as a function of time will represent a graph having time as the abscissa, for example subdivided into weeks or months, and the amount in nanometres or micrometres of the relative displacement occurring between the first reference point A and the second reference point B as the ordinate.

In one embodiment, the method comprises:

sending an alert message via means of communication that are operatively connected to the processing unit when the value of the relative movements of the first and second reference point A, B reaches or exceeds a predefined threshold value.

Indeed, it is possible to define in advance a threshold value which brings about communication by the processing unit of a possible dangerous condition or the development of the displacements towards a potentially dangerous condition.

This evaluation system of the displacements as a function of time will also be able to make it possible to provide at least a first estimate of the timings for intervening, thus avoiding failure to implement effective interventions as a result of a lack of understanding of the need for good timing.

The invention claimed is:

1. Displacement transducer device (1) configured to be coupled to reference points of a structure, the displacement transducer comprising:

a first element (6) configured to be integrally secured to a corresponding first reference point (A) of said structure, a first magnet (3; 23; 33) and a second magnet (4; 24; 34) arranged so as to magnetically repel one another, a transducer (5; 25; 35) arranged proximate said first and second magnet (3, 4; 23, 24; 33, 34) and designed so as to detect a variation in the magnetic field present between said first and second magnet (3, 4; 23, 24; 33, 34) and to convert said variation into a signal which can be processed by a processing unit, a second element (7) configured to be integrally secured to a second reference point (B) of said structure, said first reference point (A) and second reference point (B) being points of said structure different from one another, and one of said first magnet (3; 23; 33), second magnet (4; 24; 34) or transducer (5; 25; 35) being constrained to said first element (6) and the remaining elements of said first magnet (3; 23; 33), second magnet (4; 24; 34) or transducer (5; 25; 35) being constrained to said second element (7) such that a relative and independent movement of said first reference point (A) or of said second reference point (B) causes a variation in the magnetic field that can be detected by said transducer (5; 25; 35), a first spacer (8) integrally arranged between said first reference point (A) and said first element (6), a second spacer (9) integrally arranged between said second reference point (B) and said second element (7), wherein said first and second elements (6, 7) are slab-shaped and are each connected by a first end (6a, 7a) to said first and second spacer (8, 9), respectively, a second pair of said first and second magnets (23, 24), wherein said first and second magnets (23, 24) are cylindrical or prism-shaped and each have a first and second flat base (23a, 24a), respectively, that face one another, said first base (23a) is oriented perpendicularly to the upper surface of said first element (6), said second base (24a) is oriented perpendicularly to the upper surface of said first element (6) or of said second element (7), a second longitudinal axis (L2) passes through the respective centers of mass of said first and second magnet (23, 24), said first and second magnets (23, 24) are respectively connected to or near to second free ends (6b, 7b), which are opposite said first ends (6a, 7a), of said first and second elements (6, 7) such that the movements of said first and second magnet (23, 24) or of said transducer (25) caused by relative movements of said first or second reference point (A, B) are parallel to said second longitudinal axis (L2), said second longitudinal axis (L2) being parallel to a straight line (X) which passes through said first and second reference points (A, B).

2. The transducer device (1) according to claim 1, wherein said transducer (5; 25; 35) is arranged between said first magnet (3; 23; 33) and said second magnet (4; 24; 34).

3. The transducer device (1) according to claim 1, wherein said first and second magnet (3, 4; 23, 24; 33, 34) are permanent magnets.

4. The transducer device (1) according to claim 1, wherein said transducer (5; 25; 35) is a monoaxial, biaxial or triaxial Hall effect sensor.

5. The transducer device (1) according to claim 1, further comprising a humidity sensor or a temperature sensor or both a humidity sensor and a temperature sensor.

6. The transducer device (1) according to claim 1, further comprising:

a first pair of said first and second magnet (3, 4), wherein said first and second magnet (3,4) are cylindrical or prism-shaped and have a first and second flat base (3a, 4a), respectively, which face one another,
said first base (3a) matches the upper surface of said first element (6),
a base (4b) opposite said second base (4a) of said second magnet (4) matches the upper surface of said second element (7),
a first longitudinal axis (L1) passes through the respective centers of mass of said first and second magnet (3, 4),
said first and second magnets (3, 4) being respectively constrained to second free ends (6b, 7b), which are opposite said first ends (6a, 7a), of said first and second element (6, 7) such that the movements of said first and second magnet (3, 4) or of said transducer (5) caused by movements of said first or second reference point (A, B) are perpendicular to said first longitudinal axis (L1), said first longitudinal axis (L1) being perpendicular to a straight line (X) which passes through said first and second reference point (A, B).

7. The transducer device (1) according to claim 1, wherein said first and second magnet (3, 4) are cylindrical or prism-shaped, have a first and second flat base (3a, 4a), respectively, which face one another, and are integrally constrained to said first element (6), and
said transducer (5) is connected to said second element (7).

8. Method for detecting movements between two reference points of a structure, comprising:
providing a displacement transducer device (1) according to claim 1,
identifying a first reference point (A) and a second reference point (B) of said structure in question,
constraining a first element (6) of said displacement transducer device (1) to said first reference point (A),
constraining a second element (7) of said displacement transducer device (1) to said second reference point (B),
connecting a processing unit to a transducer (5) of said displacement transducer device (1), and
monitoring the data collected by the transducer (5) and processed by said processing unit so as to detect any relative movements of said first and second reference point (A, B) as a function of time.

9. The method according to claim 8, further comprising:
sending an alert message via means of communication that are operatively connected to said processing unit when the value of said relative movements of said first and second reference point (A, B) reaches or exceeds a predefined threshold value.

10. Displacement transducer device (1) configured to be coupled to reference points of a structure, the displacement transducer comprising:
a first element (6) configured to be integrally secured to a corresponding first reference point (A) of said structure,
a first magnet (3; 23; 33) and a second magnet (4; 24; 34) arranged so as to magnetically repel one another,
a transducer (5; 25; 35) arranged proximate said first and second magnet (3, 4; 23, 24; 33, 34) and designed so as to detect a variation in the magnetic field present between said first and second magnet (3, 4; 23, 24; 33, 34) and to convert said variation into a signal which can be processed by a processing unit,
a second element (7) configured to be integrally secured to a second reference point (B) of said structure, said first reference point (A) and second reference point (B) being points of said structure different from one another, and one of said first magnet (3; 23; 33), second magnet (4; 24; 34) or transducer (5; 25; 35) being constrained to said first element (6) and the remaining elements of said first magnet (3; 23; 33), second magnet (4; 24; 34) or transducer (5; 25; 35) being constrained to said second element (7) such that a relative and independent movement of said first reference point (A) or of said second reference point (B) causes a variation in the magnetic field that can be detected by said transducer (5; 25; 35),
a first spacer (8) integrally arranged between said first reference point (A) and said first element (6),
a second spacer (9) integrally arranged between said second reference point (B) and said second element (7), wherein said first and second elements (6, 7) are slab-shaped and are each connected by a first end (6a, 7a) to said first and second spacer (8, 9), respectively,
a first pair of said first and second magnet (3, 4), wherein said first and second magnets (3,4) are cylindrical or prism-shaped and have a first and second flat base (3a, 4a), respectively, which face one another,
said first base (3a) matches the upper surface of said first element (6),
a base (4b) opposite said second base (4a) of said second magnet (4) matches the upper surface of said second element (7),
a first longitudinal axis (L1) passes through the respective centers of mass of said first and second magnet (3, 4),
said first and second magnets (3, 4) being respectively constrained to second free ends (6b, 7b), which are opposite said first ends (6a, 7a), of said first and second element (6, 7) such that the movements of said first and second magnet (3, 4) or of said transducer (5) caused by movements of said first or second reference point (A, B) are perpendicular to said first longitudinal axis (L1), said first longitudinal axis (L1) being perpendicular to a straight line (X) which passes through said first and second reference point (A, B),
a third pair of first and second magnets, wherein said first pair of first and second magnets (3, 4), said second pair of first and second magnets (23, 24), and said third pair of first and second magnets (33, 34), each bear a first transducer (5), a second transducer (25) and a third transducer (35), respectively, arranged between said pairs of magnets,
said first longitudinal axis (L1) passing through the respective centers of mass of said first pair of said first and second magnet (3, 4) perpendicularly to both said straight line (X), which passes through said first and second reference point (A, B), and to a main extension of a crack (F), when present in a surface of said structure in question;
said second longitudinal axis (L2) passing through the respective centers of mass of said second pair of said first and second magnet (23, 24) in parallel with said straight line (X), which passes through said first and second reference point (A, B), and perpendicularly to the main extension of said crack (F) when present;
a third longitudinal axis (L3) passing through the respective centers of mass of said third pair of the first and second magnet (33, 34) perpendicularly to said straight line (X), which passes through the first and second reference point (A, B), and parallel to said main extension of said crack (F) when present.

11. The transducer device (1) according to claim 10, wherein said transducer (5; 25; 35) is arranged between said first magnet (3; 23; 33) and said second magnet (4; 24; 34).

12. The transducer device (1) according to claim 10, wherein said first and second magnet (3, 4; 23, 24; 33, 34) are permanent magnets.

13. The transducer device (1) according to claim 10, wherein said transducer (5; 25; 35) is a monoaxial, biaxial or triaxial Hall effect sensor.

14. The transducer device (1) according to claim 10, further comprising a humidity sensor or a temperature sensor or both a humidity sensor and a temperature sensor.

15. Method for detecting movements between two reference points of a structure, comprising:
 providing a displacement transducer device (1) according to claim 9,
 identifying a first reference point (A) and a second reference point (B) of said structure in question,
 constraining a first element (6) of said displacement transducer device (1) to said first reference point (A),
 constraining a second element (7) of said displacement transducer device (1) to said second reference point (B),
 connecting a processing unit to a transducer (5) of said displacement transducer device (1), and
 monitoring the data collected by the transducer (5) and processed by said processing unit so as to detect any relative movements of said first and second reference point (A, B) as a function of time.

16. The method according to claim 15, further comprising:
 sending an alert message via means of communication that are operatively connected to said processing unit when the value of said relative movements of said first and second reference point (A, B) reaches or exceeds a predefined threshold value.

\* \* \* \* \*